United States Patent
Nelson

(10) Patent No.: US 9,382,932 B2
(45) Date of Patent: Jul. 5, 2016

(54) CONNECTOR SYSTEM

(71) Applicant: Play from Scratch, LLC, St. Paul, MN (US)

(72) Inventor: Jeffrey Freeland Nelson, Saint Paul, MN (US)

(73) Assignee: Play from Scratch LLC, St. Paul, MN (US)

( * ) Notice: Subject to any disclaimer, the term of this patent is extended or adjusted under 35 U.S.C. 154(b) by 0 days.

(21) Appl. No.: 14/211,881

(22) Filed: Mar. 14, 2014

(65) Prior Publication Data

US 2014/0270914 A1    Sep. 18, 2014

Related U.S. Application Data

(60) Provisional application No. 61/789,347, filed on Mar. 15, 2013.

(51) Int. Cl.
*F16B 7/04*      (2006.01)

(52) U.S. Cl.
CPC ........... *F16B 7/0446* (2013.01); *Y10T 403/341* (2015.01); *Y10T 403/55* (2015.01); *Y10T 403/70* (2015.01)

(58) Field of Classification Search
CPC  Y10T 403/55; Y10T 403/341; A63H 33/084; F16B 7/00; F16B 7/0446
USPC ......... 403/173, 250, 251, 252, 292, 293, 294, 403/345; 24/67 R, 67.9, 130, 129 B, 563; 248/309.1, 37.3, 37.6, 346.01, 346.03; 446/111, 124, 126
See application file for complete search history.

(56) References Cited

U.S. PATENT DOCUMENTS

| | | | |
|---|---|---|---|
| 1,894,061 A | 1/1933 | Sanders |
| 2,027,885 A | 1/1936 | Schwarzbach |
| 2,472,363 A | 6/1949 | Blackinton |
| 2,633,662 A | 4/1953 | Nelson |
| 2,691,243 A | 10/1954 | Rade |
| 2,800,743 A | 7/1957 | Meehan et al. |

(Continued)

FOREIGN PATENT DOCUMENTS

| | | | |
|---|---|---|---|
| EP | 2193830 A1 | 6/2010 |
| EP | 2468374 A1 | 6/2012 |

(Continued)

OTHER PUBLICATIONS

"U.S. Appl. No. 14/213,123, Non Final Office Action mailed Jan. 20, 2015", 26 pgs.

(Continued)

*Primary Examiner* — Gregory Binda
*Assistant Examiner* — Nahid Amiri
(74) *Attorney, Agent, or Firm* — Schwegman Lundberg & Woessner, P.A.

(57) ABSTRACT

Paper cylinders or tubes may be connected to one another using any of a variety of connectors. The connectors incorporate features that may facilitate connecting the paper cylinders or tubes at a wide range of angles to form a variety of two- and three -dimensional shapes, while obviating the need to use tape or glue, thereby potentially improving the aesthetics of objects produced using the connectors. Further, objects produced using the connectors disclosed herein can be disassembled, facilitating reuse of the paper cylinders or tubes.

18 Claims, 15 Drawing Sheets

(56) References Cited

U.S. PATENT DOCUMENTS

| | | | |
|---|---|---|---|
| 2,832,100 A | | 4/1958 | Swallert |
| 2,984,935 A | | 5/1961 | Beck |
| 3,004,784 A | * | 10/1961 | Selby ..................... 403/19 |
| 3,148,477 A | | 9/1964 | Bjorn et al. |
| 3,554,382 A | | 1/1971 | Grinbergs |
| 3,558,138 A | | 1/1971 | Lemelson |
| 3,564,758 A | | 2/1971 | Willis |
| 3,570,169 A | | 3/1971 | Jacob |
| 3,626,632 A | | 12/1971 | Bullock, Jr. |
| 3,698,124 A | * | 10/1972 | Reitzel et al. ................ 446/114 |
| 3,855,748 A | * | 12/1974 | Thomas ..................... 52/578 |
| 3,940,100 A | * | 2/1976 | Haug ........................ 248/188.1 |
| 4,055,019 A | | 10/1977 | Harvey |
| 4,335,165 A | * | 6/1982 | Powers ..................... 428/8 |
| 4,530,196 A | | 7/1985 | O'bryan |
| 4,550,543 A | | 11/1985 | Valenzano |
| 4,758,196 A | | 7/1988 | Wang |
| 4,789,370 A | | 12/1988 | Ellefson |
| 4,793,725 A | * | 12/1988 | Cheng ........................ 403/174 |
| 5,097,645 A | | 3/1992 | Sanderson |
| 5,121,526 A | * | 6/1992 | Burkard et al. .................. 24/336 |
| 5,273,477 A | | 12/1993 | Adams, Jr. |
| RE35,085 E | * | 11/1995 | Sanderson ................... 52/655.1 |
| 5,593,337 A | | 1/1997 | Lapointe |
| 5,601,470 A | | 2/1997 | Yao |
| 5,628,666 A | * | 5/1997 | Tomczyk et al. ............. 446/125 |
| 5,672,087 A | | 9/1997 | De La Paz Rizo et al. |
| 5,681,041 A | | 10/1997 | Coon |
| 5,833,512 A | | 11/1998 | Nicola |
| 5,853,313 A | | 12/1998 | Zheng |
| 5,895,306 A | | 4/1999 | Cunningham |
| 6,015,150 A | | 1/2000 | Giguere |
| 6,149,487 A | * | 11/2000 | Peng ........................ 446/114 |
| 6,179,681 B1 | | 1/2001 | Matos |
| 6,389,652 B1 | * | 5/2002 | Williams .................. 24/30.5 R |
| 6,422,909 B2 | | 7/2002 | Clever et al. |
| 6,558,222 B1 | | 5/2003 | Maddock |
| 6,592,421 B1 | * | 7/2003 | Clever ........................ 446/108 |
| 6,626,732 B1 | * | 9/2003 | Chung ........................ 446/387 |
| 6,672,931 B1 | | 1/2004 | Bagley |
| 6,758,333 B2 | | 7/2004 | Sherman |
| 7,047,576 B2 | | 5/2006 | Tavivian |
| 7,318,764 B2 | * | 1/2008 | Elias ........................ 446/108 |
| 7,371,146 B2 | * | 5/2008 | Scarborough ................... 446/85 |
| 7,469,898 B2 | | 12/2008 | Forakis |
| 7,708,317 B2 | * | 5/2010 | Leblanc ........................ 285/31 |
| D623,241 S | * | 9/2010 | Ruble, IV ................... D21/488 |
| 7,833,077 B1 | | 11/2010 | Simmons, Jr. |
| 8,506,206 B2 | * | 8/2013 | Desmeules ................. 405/232 |
| 8,528,291 B2 | * | 9/2013 | Allred et al. ................. 52/655.1 |
| 8,621,739 B1 | | 1/2014 | Elliot |
| D717,884 S | * | 11/2014 | Duriez ........................ D21/501 |
| 2002/0078653 A1 | | 6/2002 | Jean |
| 2002/0090881 A1 | | 7/2002 | Turnham |
| 2003/0054725 A1 | | 3/2003 | Liu |
| 2012/0000059 A1 | | 1/2012 | Fox et al. |
| 2012/0028534 A1 | | 2/2012 | Unger |
| 2013/0178129 A1 | | 7/2013 | Habibi |
| 2013/0230353 A1 | | 9/2013 | Murphy et al. |
| 2014/0270915 A1 | | 9/2014 | Nelson |

FOREIGN PATENT DOCUMENTS

| | | |
|---|---|---|
| WO | WO-7900567 A1 | 8/1979 |
| WO | WO-9304750 A1 | 3/1993 |
| WO | WO-9823347 A1 | 6/1998 |
| WO | WO-9830300 A1 | 7/1998 |
| WO | WO-9913954 A1 | 3/1999 |
| WO | WO-9925443 A1 | 5/1999 |
| WO | WO-2012041324 A1 | 4/2012 |
| WO | WO-2014144457 A1 | 9/2014 |

OTHER PUBLICATIONS

"International Application Serial No. PCT/US2014/028876, International Search Report mailed Aug. 8, 2014", 3 pgs.

"International Application Serial No. PCT/US2014/028876, Written Opinion mailed Aug. 8, 2014", 7 pgs.

"U.S. Appl. No. 14/213,123, Final Office Action mailed Oct. 22, 2015", 25 pgs.

"U.S. Appl. No. 14/213,123, Response filed Jan. 22, 2016 to Final Office Action mailed Oct. 22, 2015", 12 pgs.

"U.S. Appl. No. 14/213,123, Response filed Jun. 12, 2015 to Non Final Office Action mailed Jan. 20, 2015", 19 pgs.

"International Application Serial No. PCT/US2014/028876, International Preliminary Report on Patentability mailed Sep. 24, 2015", 9 pgs.

* cited by examiner

9,382,932 B2

CONNECTOR SYSTEM

CLAIM OF PRIORITY

This Application claims the priority benefit of U.S. Provisional Patent Application No. 61/789,347, filed Mar. 15, 2013, the entire contents of which is incorporated herein by reference.

TECHNICAL FIELD

This disclosure relates generally to toy connectors for connecting paper tubes.

BACKGROUND

Certain household products, such as bathroom tissue, paper towels, and aluminum foil are often sold rolled on paper cylinders or tubes. After these household products are exhausted, an issue remains relating to disposition of the paper cylinder or tube. Many consumers opt to discard the tubes. This is a convenient option, but contributes to volume of waste, for example, in landfills. Other consumers opt to recycle the tubes. This option is more environmentally friendly, but still involves the use of energy and other resources in the recycling process.

Still other consumers, particularly consumers with children, may repurpose the tubes for a variety of uses, including, for example, household and school projects. Many such projects may involve connecting paper tubes or cylinders together to form larger structures, such as, for example, simulated animals and buildings. Conventionally, paper tubes or cylinders may be connected to one another using tape or glue. This approach may present a number of challenges, such as, for example, connecting the tubes at uncommon angles, difficulty of assembly, and/or aesthetic challenges associated with excessive use of tape or glue.

SUMMARY OF THE DISCLOSURE

According to various example embodiments, paper cylinders or tubes may be connected to one another using any of a variety of connectors disclosed herein. The connectors incorporate features that may facilitate connecting the paper cylinders or tubes at a wide range of angles to form a variety of two- and three-dimensional shapes, while obviating the need to use tape or glue, thereby potentially improving the aesthetics of objects produced using the connectors disclosed herein. Further, objects produced using the connectors disclosed herein can be disassembled, facilitating reuse of the paper cylinders or tubes.

DETAILED DESCRIPTION

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

According to various example embodiments, paper cylinders or tubes may be connected to one another using any of a variety of connectors disclosed herein. The connectors incorporate features that may facilitate connecting the paper cylinders or tubes at a wide range of angles to form a variety of two- and three-dimensional shapes, while obviating the need to use tape or glue, thereby potentially improving the aesthetics of objects produced using the connectors disclosed herein. Further, objects produced using the connectors disclosed herein can be disassembled, facilitating reuse of the paper cylinders or tubes.

Figure 1:
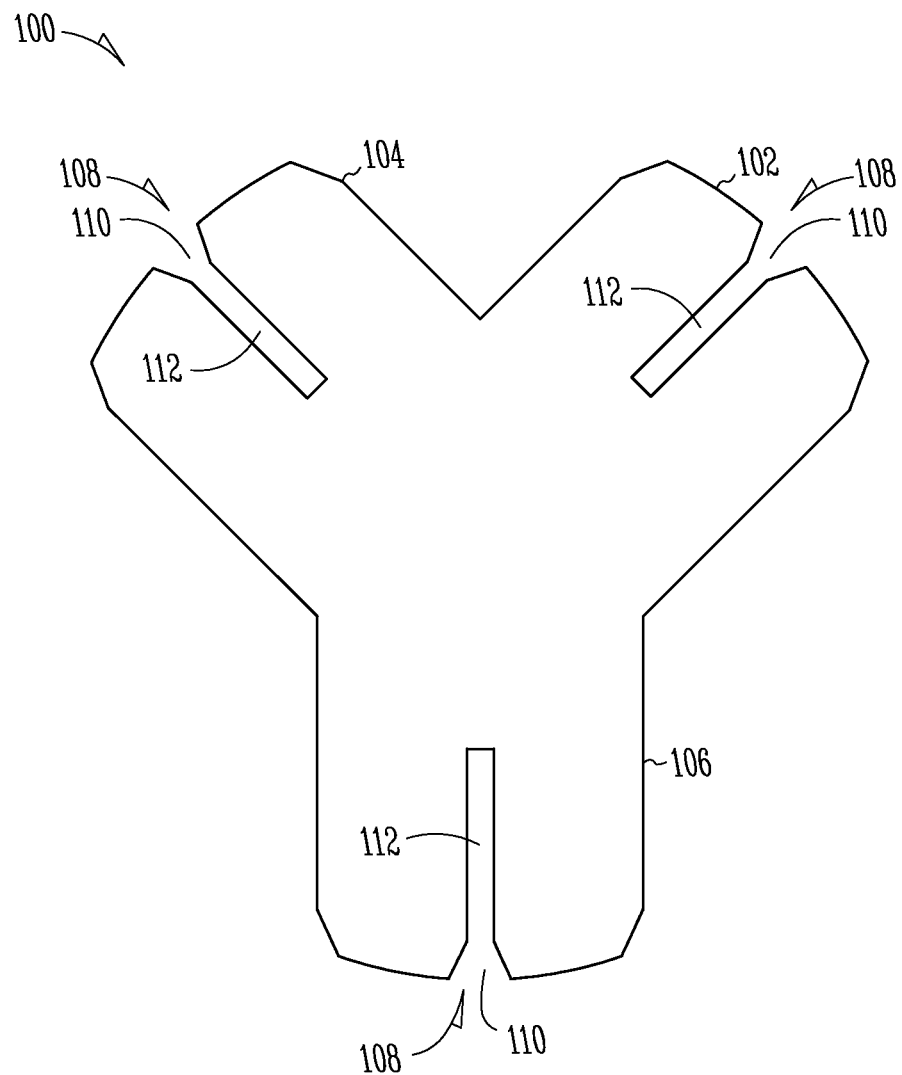
FIG. 1 is a plan view of an example connector according to an embodiment.

FIG. 1 is a plan view of an example Y-shaped connector 100. The Y-shaped connector 100 includes three arms 102, 104, 106, each of which has a slotted notch 108 formed therein. The slotted notches 108 each have a substantially triangular portion 110 and a linear portion 112. The triangular portions 110 facilitate connections to other connectors disclosed herein at a variety of angles. The linear portions 112 facilitate connections to other connectors disclosed herein in an interlocking manner.

Figure 5:
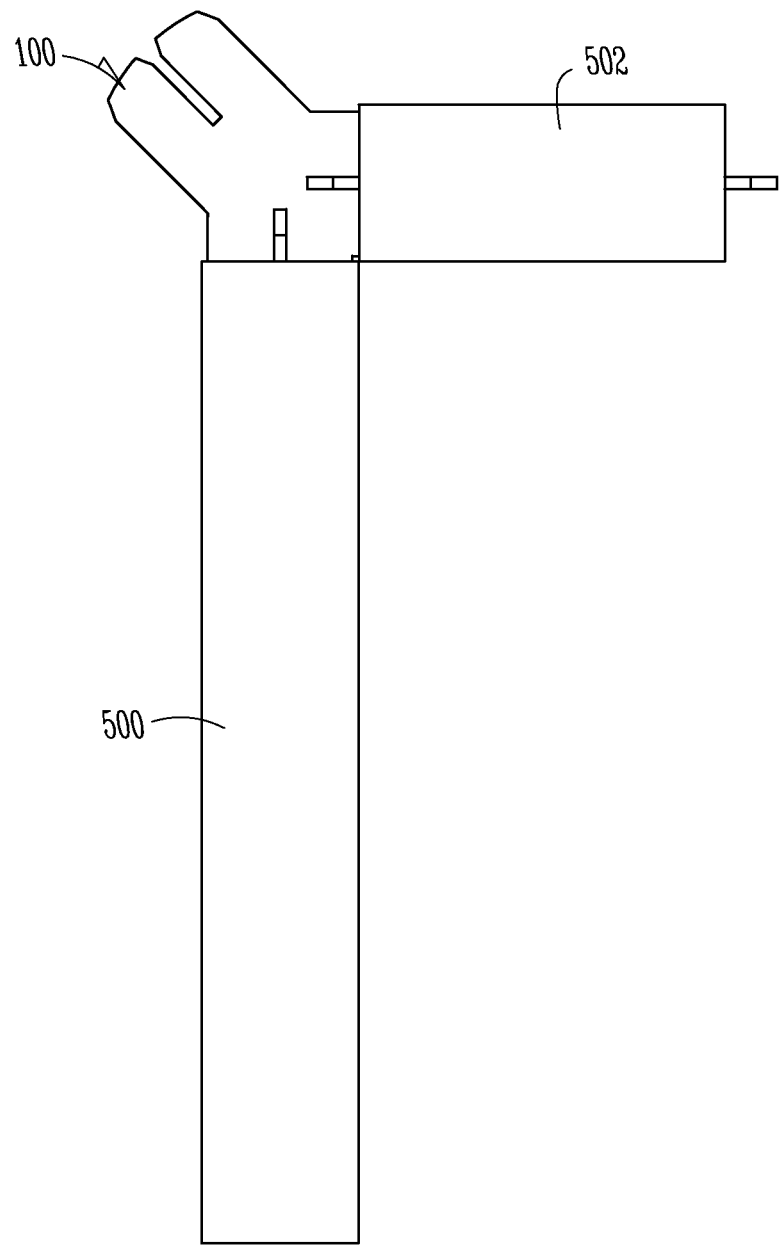
FIG. 5 is a perspective view of paper cylinders connected in one configuration using the connector of FIG. 1.
Figure 6:
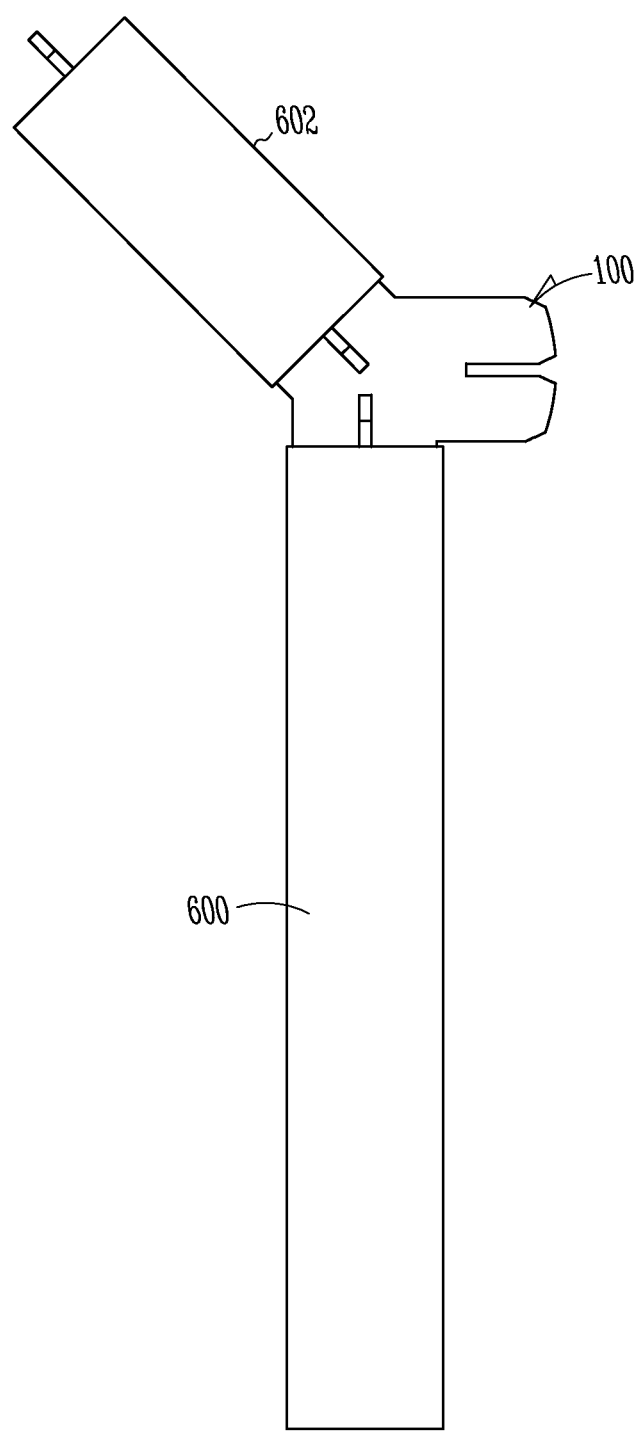
FIG. 6 is a perspective view of paper cylinders connected in another configuration using the connector of FIG. 1.

In the example shown in FIG. 1, the angle between arms 102 and 104 is substantially 90°. The angles between arms 102 and 106 and between arms 104 and 106 are substantially 135°. This variation in angles allows paper tubes or cylinders to be connected at either 90° or 135° angles, as shown in FIGS. 5 and 6 respectively, by selecting the arms to which paper tubes are connected. It will be appreciated that other embodiments of the Y-shaped connector 100 may have arms at different angles than shown in FIG. 1, e.g., evenly spaced at substantially 120° apart.

In the example shown in FIG. 1, the arms 102, 104, 106 are approximately 1.7" wide. This dimension is slightly larger than the inner diameter of a paper tube or cylinder of the type commonly used to package bathroom tissue or paper towels. Accordingly, when a paper tube or cylinder is connected to the connector 100, the connector 100 applies pressure to the inner surface of the paper tube or cylinder, facilitating a friction fit. The slotted notches 108 are approximately 1.10" deep.

Figure 2:
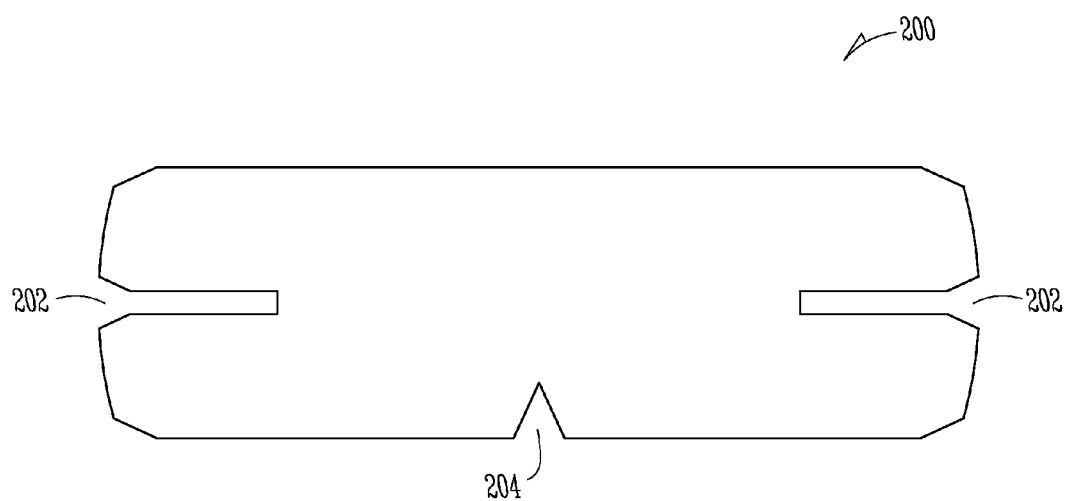
FIG. 2 is a plan view of another example connector according to another embodiment.

FIG. 2 is a plan view of an example I-shaped connector 200 according to another embodiment. The I-shaped connector 200 may be used, for example, to connect paper tubes or cylinders in a straight-line fashion or to connect to other connectors disclosed herein. The I-shaped connector 200 has two slotted notches 202, each of which may be shaped similarly to the slotted notches 108 of FIG. 1. Additionally, the I-shaped connector 200 may have a triangular notch 204 that facilitates connecting the I-shaped connector 200 to other connectors at a variety of angles.

In the example shown in FIG. 2, the I-shaped connector 200 is approximately 1.7" wide. This dimension is slightly larger than the inner diameter of a paper tube or cylinder of the type commonly used to package bathroom tissue or paper towels. Accordingly, when a paper tube or cylinder is connected to the connector 200, the connector 200 applies pressure to the inner surface of the paper tube or cylinder, facilitating a friction fit. The I-shaped connector 200 is approximately 5.5" long, allowing for a full connection through a standard bathroom tissue tube.

Figure 3:
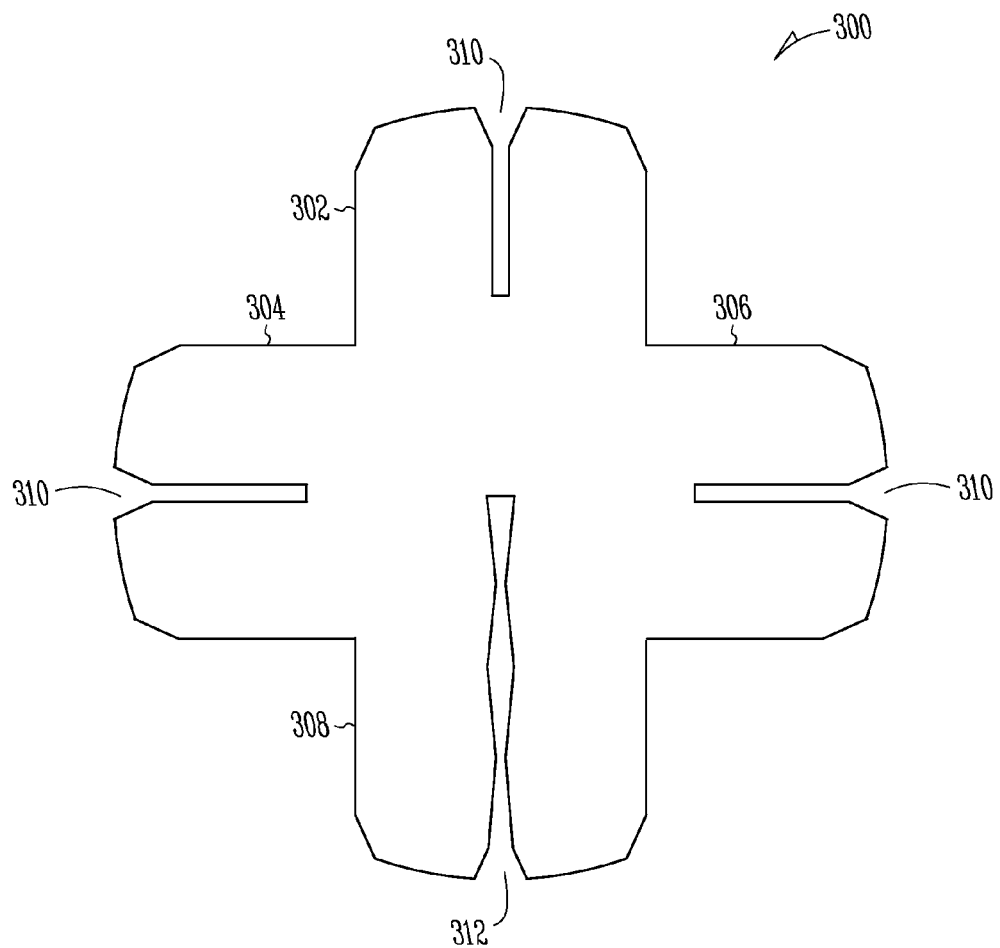
FIG. 3 is a plan view of yet another example connector according to yet another embodiment.

FIG. 3 is a plan view of an example X-shaped connector 300 according to yet another embodiment. The X-shaped connector 300 may be approximately 4.5" wide and has four arms 302, 304, 306, 308. Each arm 302, 304, 306, 308 may be approximately 1.7" wide. This dimension is slightly larger than the inner diameter of a paper tube or cylinder of the type commonly used to package bathroom tissue or paper towels. Accordingly, when a paper tube or cylinder is connected to the connector 300, the connector 300 applies pressure to the inner surface of the paper tube or cylinder, facilitating a friction fit.

The arms 302, 304, and 306 may have slotted notches 310 that may be shaped similarly to the slotted notches 108 of FIG. 1. The arm 308 may have a deeper slotted notch 312 that may be approximately 2.25" deep. This deeper slotted notch 312 facilitates connecting two X-shaped connectors 300 in an interlocking fashion. The deeper slotted notch 312 may have varying widths, e.g., with a width varying between 0.09" and 11" along the length of the notch 312. This variation in width may promote a friction fit between interlocking connectors 300.

Figure 4:
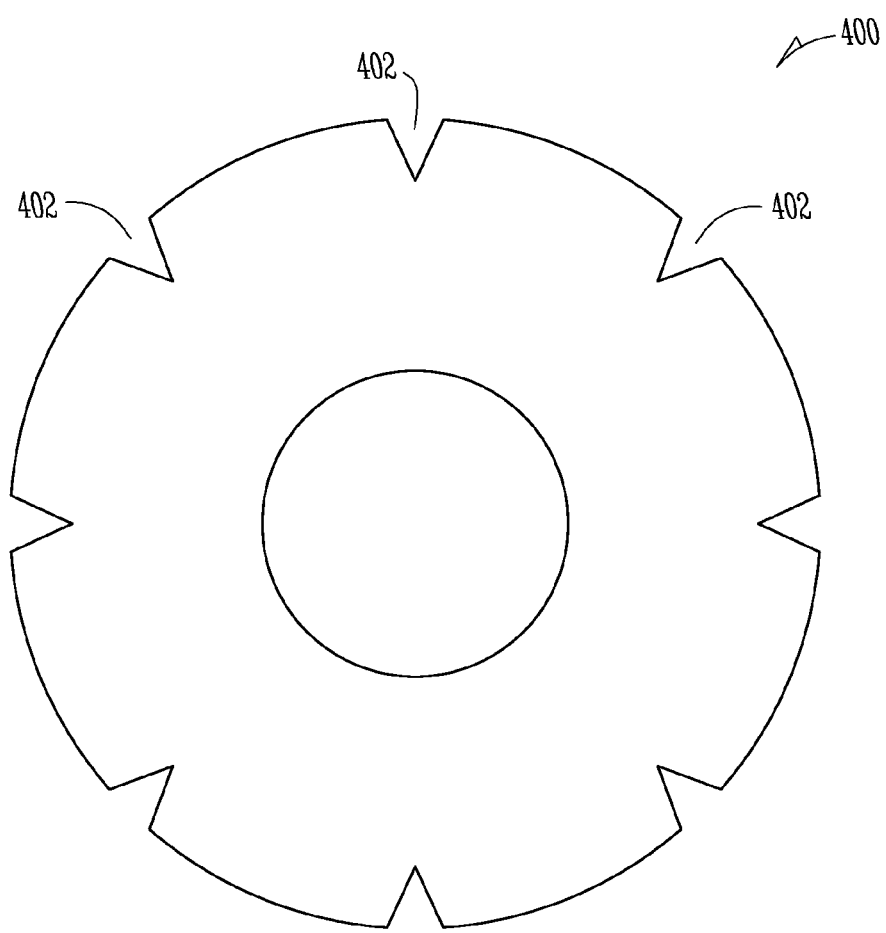
FIG. 4 is a plan view of still another example connector according to still another embodiment.

FIG. 4 is a plan view of an example O-type connector 400 according to still another embodiment. The O-type connector 400 may have an inner diameter of approximately 1.7" to accommodate a standard bathroom tissue tube and may have an outer diameter of approximately 4.5". The O-type connector 400 may have a number of triangle notches 402 formed around the perimeter of the O-type connector. The triangular notches 402 may be approximately 0.35" deep and approximately 3/32" wide. The triangular notches 402 may facilitate connection with other connector types disclosed herein at a variety of angles.

The connector types disclosed above in connection with FIGS. 1-4 can be connected to one another and to paper cylinders or tubes to form a variety of shapes.

For example, FIG. 5 is a perspective view of paper cylinders 500, 502 connected at a substantially 90° angle via the connector 100. As another example, FIG. 6 shows paper cylinders 600, 602 connected at a substantially 125° angle via the connector 100.

Figure 7:
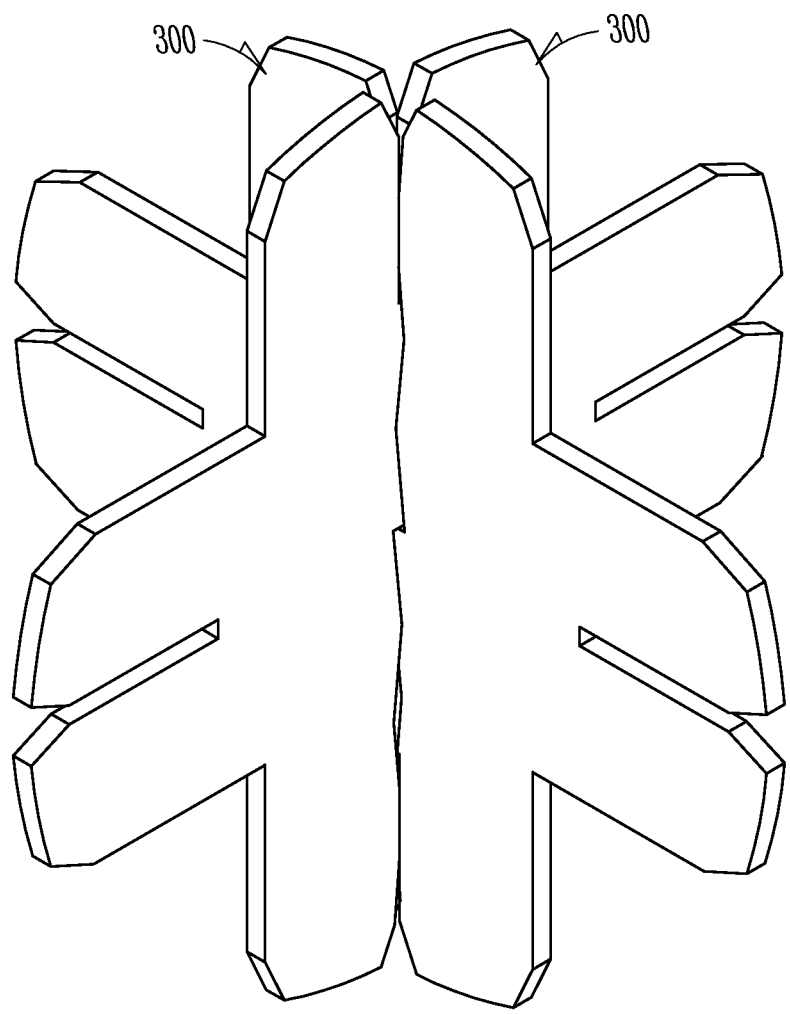
FIG. 7 is a perspective view of two interlocked connectors of the type shown in FIG. 3.

FIG. 7 is a perspective view of two interlocked X-shaped connectors 300. The X-shaped connectors 300 may interlock with one another along their respective slotted notches 312. Narrow portions of the slotted notches 312 may cooperate with each other to provide a friction fit to prevent the X-shaped connectors 300 from disengaging from one another.

Figure 8:
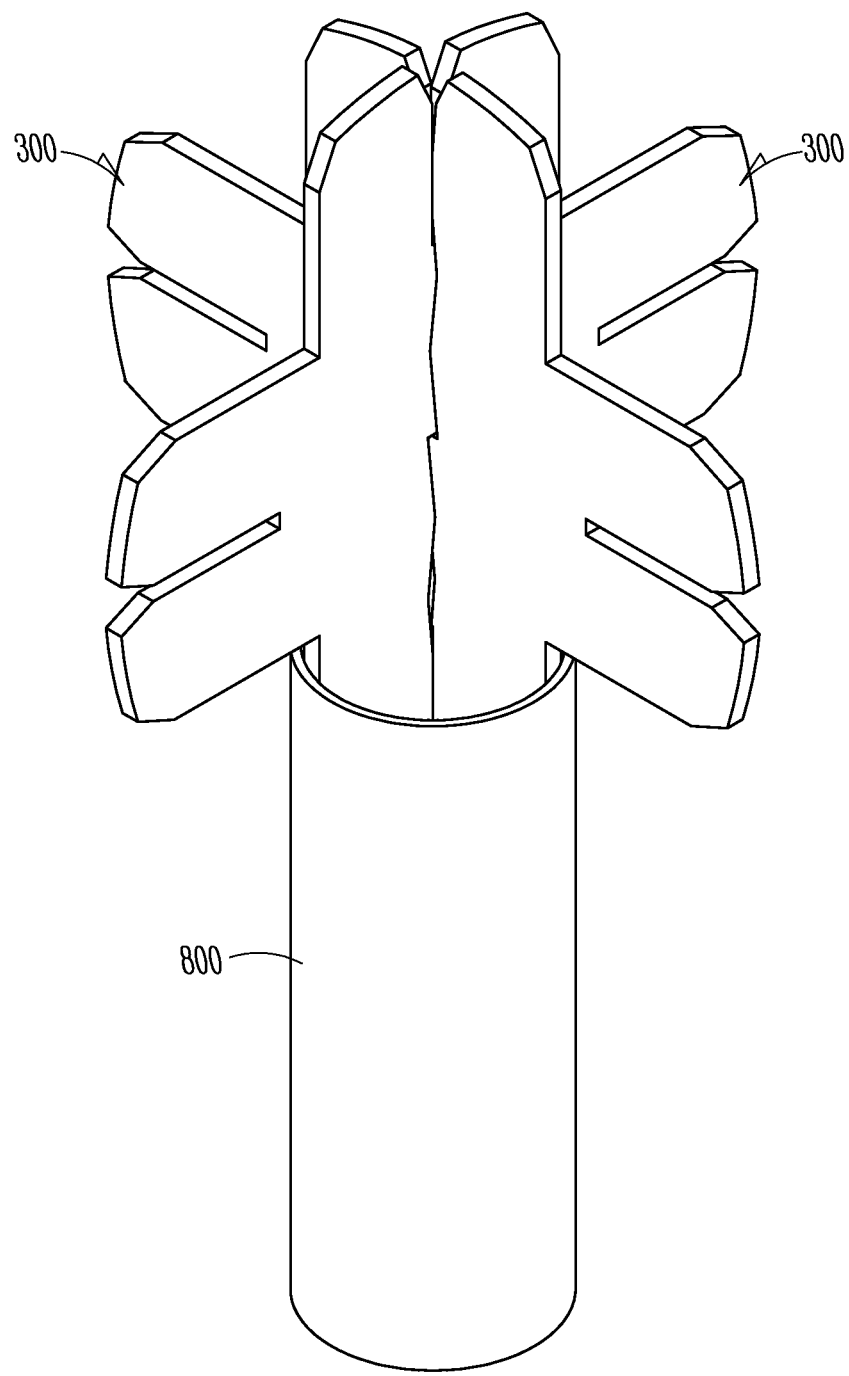
FIG. 8 is a perspective view of a paper cylinder connected to the interlocked connectors of FIG. 7.
Figure 9:
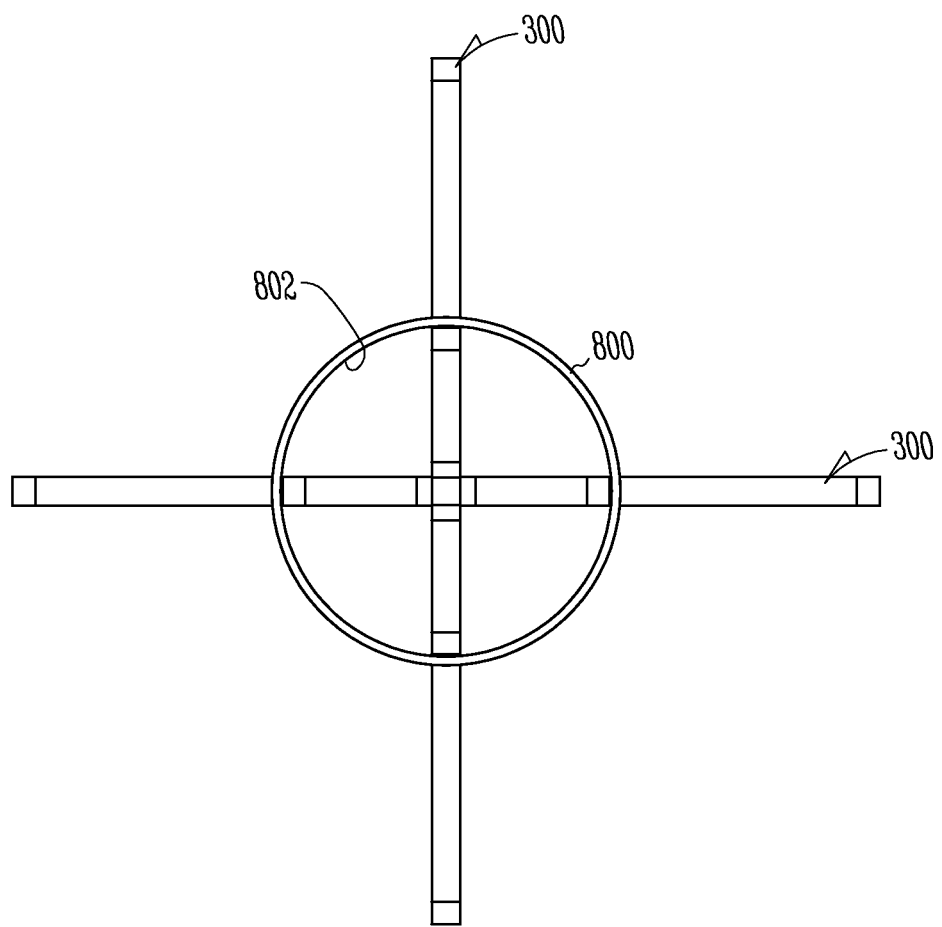
FIG. 9 is another perspective view of the configuration shown in FIG. 8.

With the X-shaped connectors 300 interlocked as shown in FIG. 7, a three-dimensional connector may be formed that can receive paper tubes or cylinders at a number of connection points, e.g., six connection points. FIGS. 8 and 9, for example, illustrate a paper cylinder 800 connected at one such connection point 802 of a three-dimensional connector formed by interlocking two X-shaped connectors 300. As shown in FIG. 9, the connection point 802 exerts a force at the inner diameter of the paper cylinder 800, facilitating a friction fit between the X-shaped connectors 300 and the paper cylinder 800 and preventing the paper cylinder 800 from disengaging from the X-shaped connectors 300.

Figure 10:
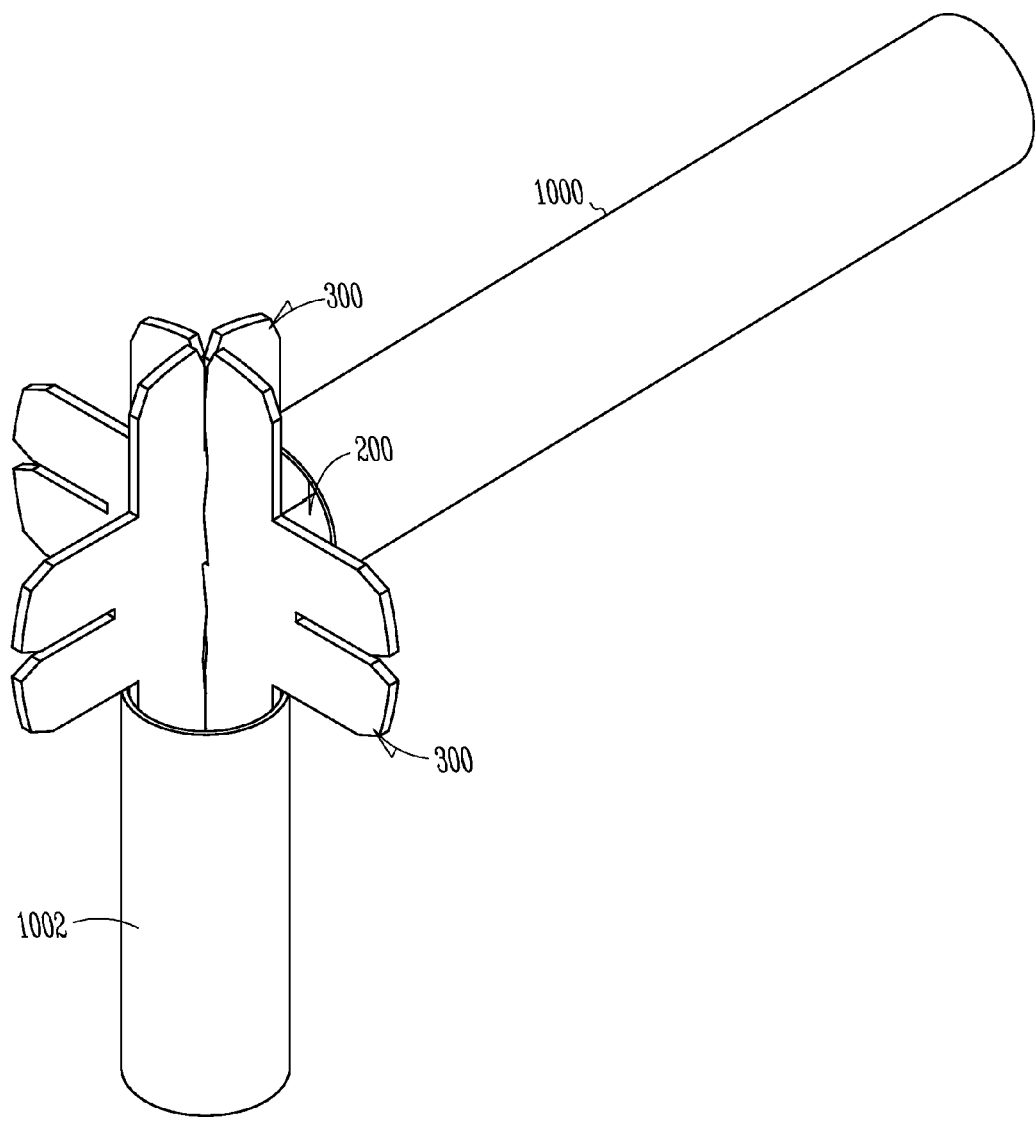
FIG. 10 is a perspective view of two paper cylinders connected to the interlocked connectors of FIG. 7.
Figure 11:
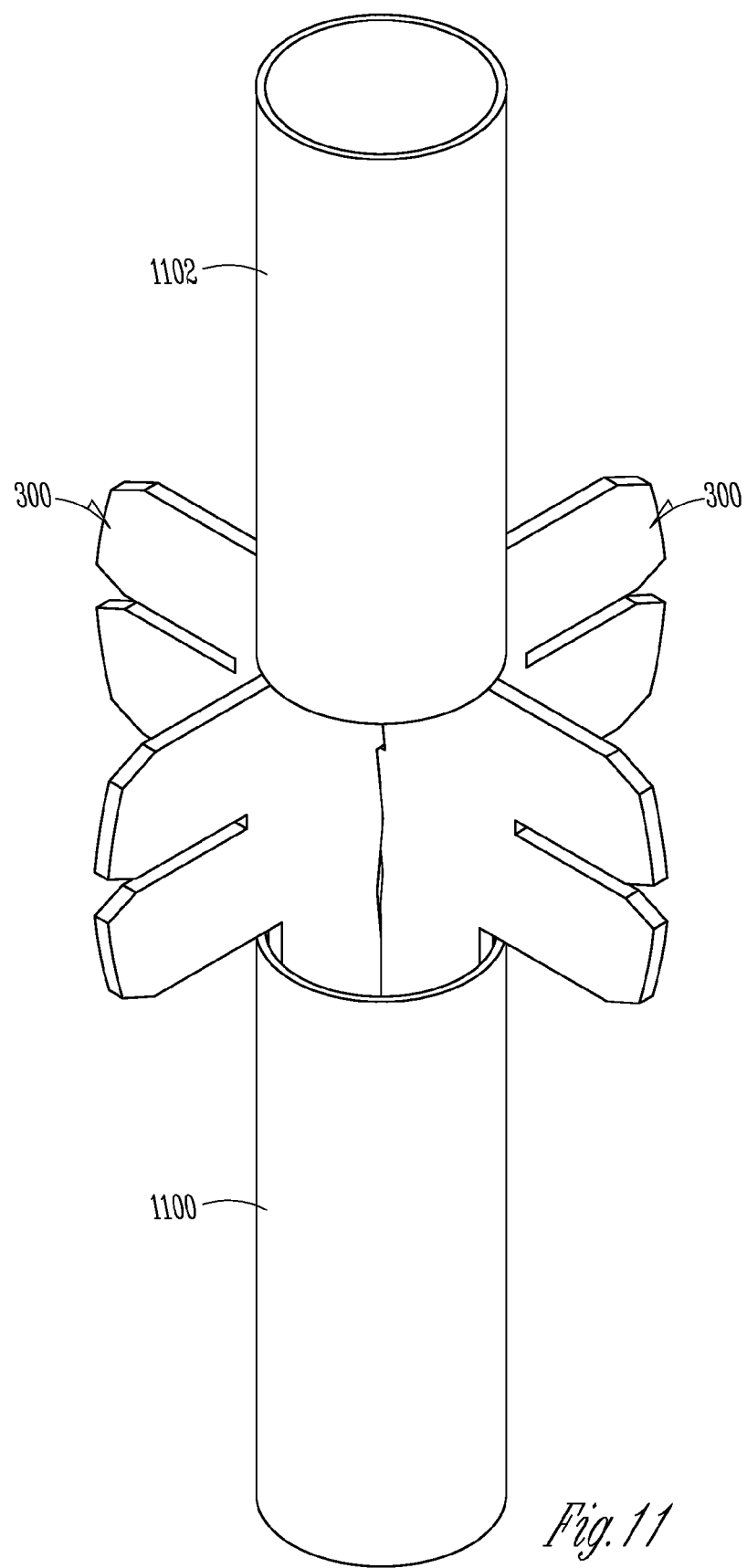
FIG. 11 is a perspective view of two paper cylinders connected to the interlocked connectors of FIG. 7 in another configuration.

FIG. 10 is a perspective view of two paper cylinders 1000, 1002 connected to interlocked X-shaped connectors 300. The paper cylinders 1000, 1002 are substantially orthogonal to one another. FIG. 11 shows two paper cylinders 1100, 1102 connected to interlocked X-shaped connectors 300 in a substantially linear fashion.

Figure 12:
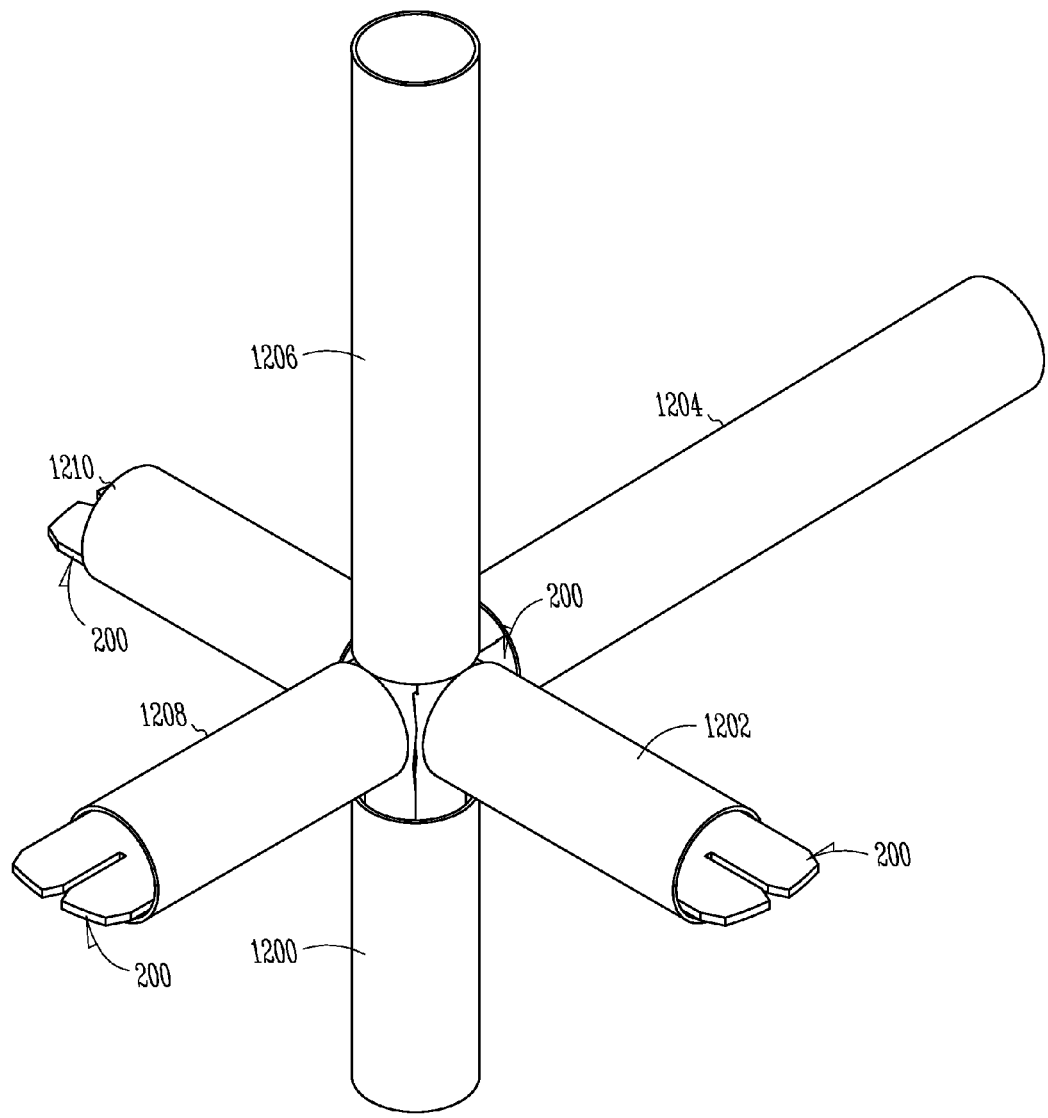
FIG. 12 is a perspective view of a number of paper cylinders connected to the interlocked connectors of FIG. 7.

FIG. 12 is a perspective view of a number of paper cylinders 1200, 1202, 1204, 1206, 1208, 1210 connected to interlocked X-shaped connectors 300. I-shaped connectors 200 may be connected to one or more of the paper cylinders, e.g., paper cylinders 1200, 1208 as shown in FIG. 12.

Figure 13:
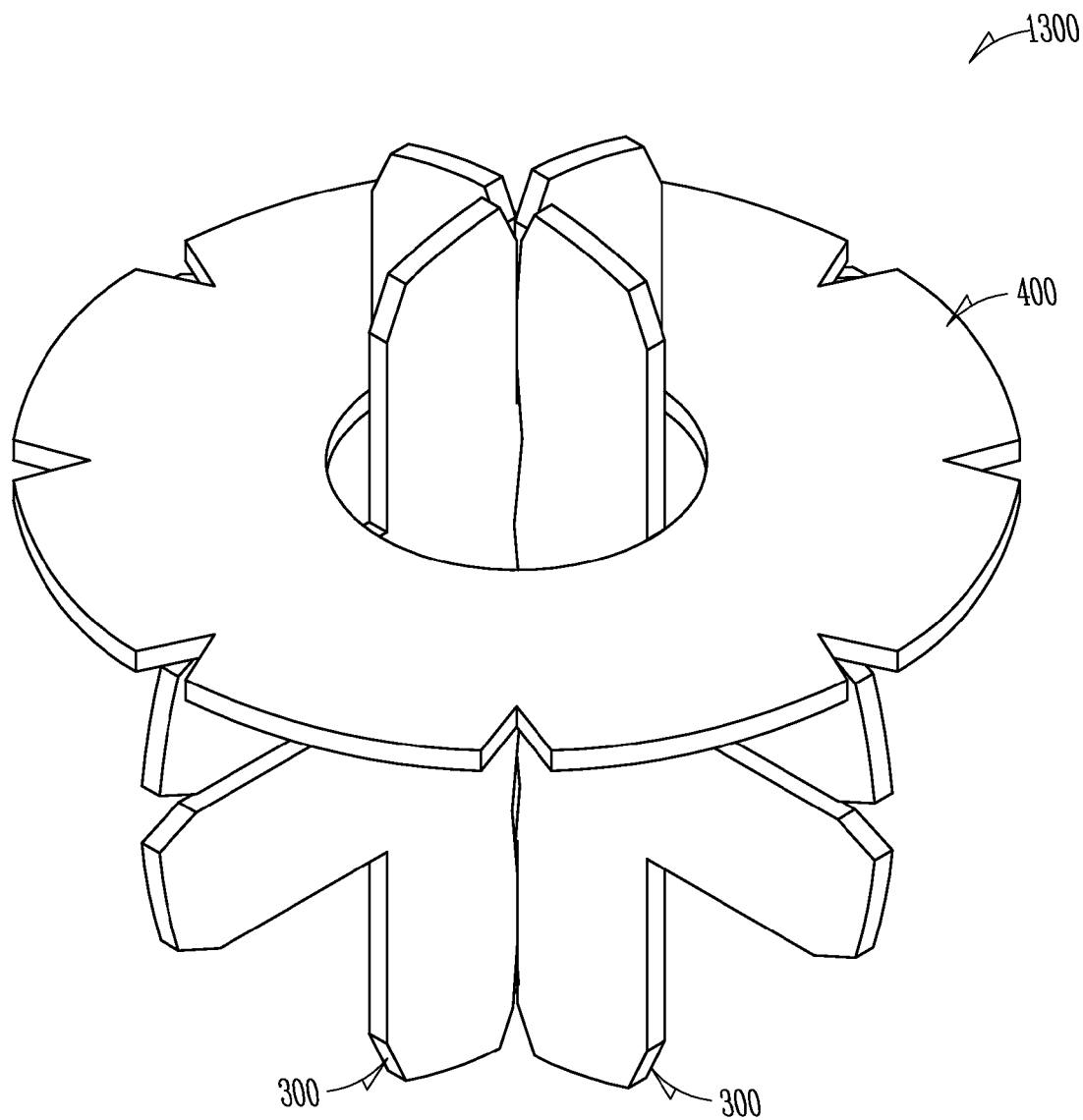
FIG. 13 is a perspective view of a connector of the type shown in FIG. 4 connected to the interlocked connectors of FIG. 7.

Besides paper cylinders or tubes, other connectors can be connected to the three-dimensional connector formed by interlocking two X-shaped connectors 300. For example, FIG. 13 illustrates a generally toric or O-shaped connector 400 connected to interlocked X-shaped connectors 300 at a connection point 1300. This configuration may be useful, for example, in providing other connection points around the perimeter of the O-shaped connector 400 to which paper cylinders or other connectors can be attached. As another example, FIG. 14 illustrates a Y-shaped connector 100 connected to interlocked X-shaped connectors 300 at a connection point 1400.

Figure 15:
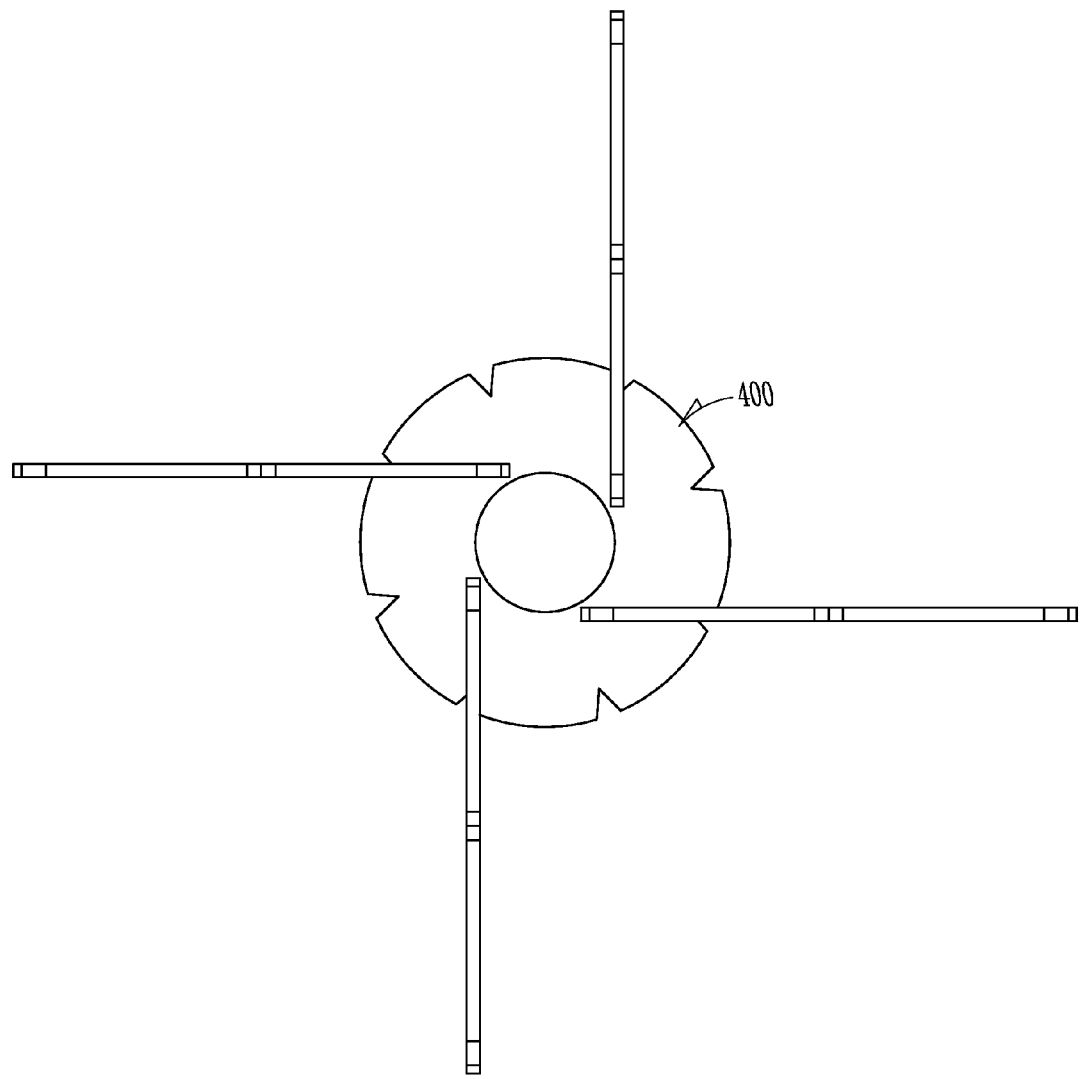
FIG. 15 is a perspective view of a number of connectors connected to the connector of the type shown in FIG. 4.

As another example of connectors cooperating with one another to form larger structures to which paper cylinders or tubes can be attached, FIG. 15 is a perspective view of a number of connectors connected to an O-shaped connector 400. The connectors may be any combination of Y-shaped connectors 100, I-shaped connectors 200, and/or X-shaped connectors 300. The slotted notches and/or triangular notches on these connectors can then form connection points to which other connectors and/or paper tubes or cylinders can be attached. In this way, structures can be constructed with a wider variety of shapes than is feasible with some conventional implementations.

Figure 14:
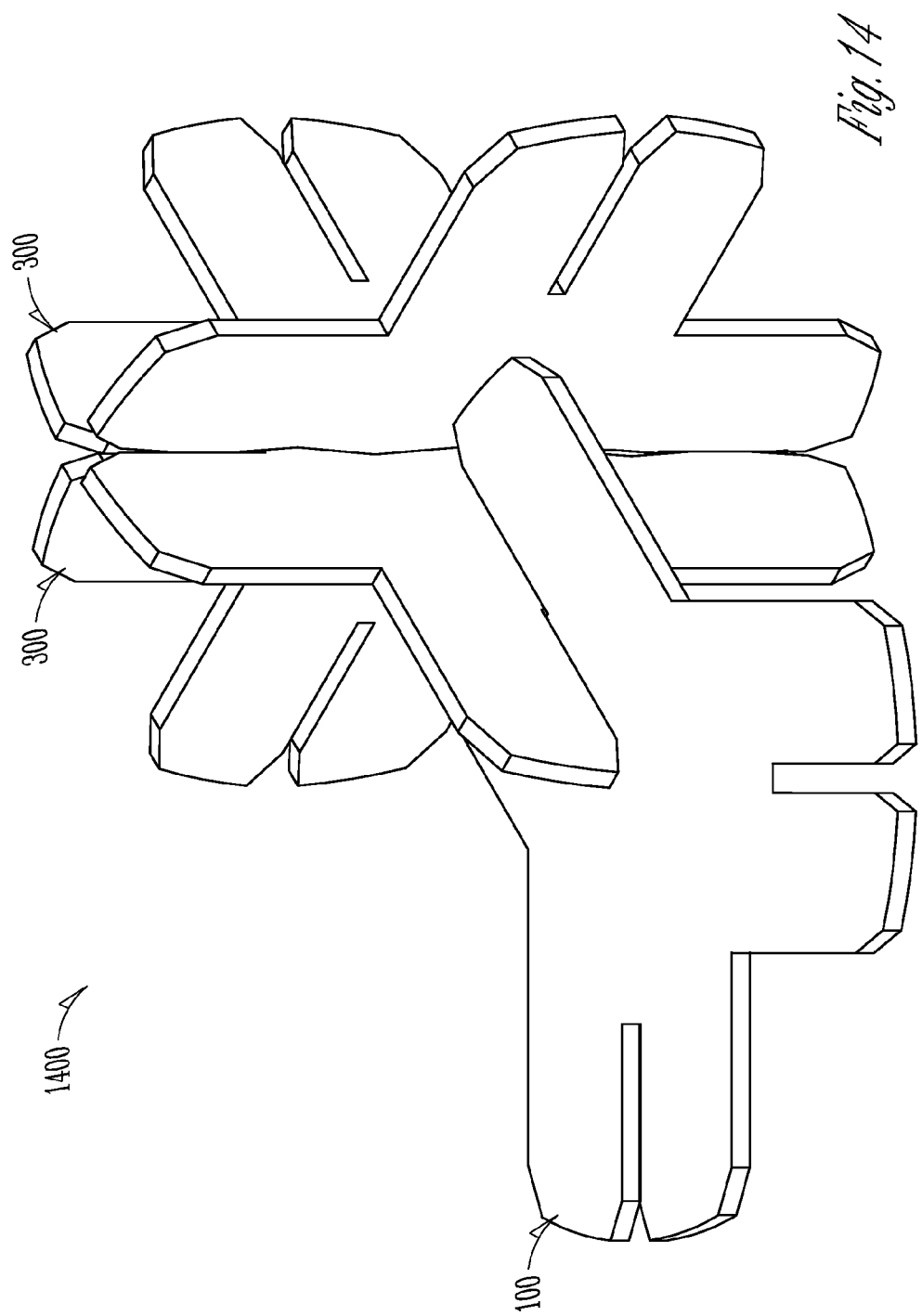
FIG. 14 is a perspective view of a connector of the type shown in FIG. 1 connected to the interlocked connectors of FIG. 7.

As shown in FIGS. 13-15, connectors may be connected to other connectors. By way of example and not limitation, connectors can be linked to one another to form structures without using paper cylinders or tubes.

It will be understood by those who practice the embodiments described herein and those skilled in the art that various modifications and improvements may be made without departing from the spirit and scope of the disclosed embodiments. For example, the dimensions recited herein are provided by way of example and not limitation. Other dimensions may be appropriate for particular applications, such as for use with paper tubes or cylinders having different inner diameters. The scope of protection afforded is to be determined solely by the claims and by the breadth of interpretation allowed by law.

What is claimed is:

1. A toy connector system comprising:
   a first flat connector having at least one arm, the at least one arm of the first connector comprising a first width and having formed thereon at least one slotted notch comprising a substantially triangular portion and a substantially linear portion extending from a vertex of the substantially triangular portion, the substantially linear portion comprising a second width that is less than or equal to a thickness of the first connector;
   a second flat connector having at least one arm, the at least one arm of the second connector comprising the first width and having formed thereon at least one slotted notch comprising a substantially triangular portion and a substantially linear portion extending from a vertex of the substantially triangular portion, the substantially linear portion of the slotted notch of the second connector comprising the second width, one of the first and second connectors being received in and coupled to the at least one slotted notch of the other of the first and second connectors such that the first and second connectors are approximately perpendicular to one another; and
   a third flat connector having a substantially O-shape with a centrally aligned hole comprising an inner diameter and a thickness that is equal to the thickness of the first and second connectors, the at least one arms of the first and second connectors being received in and surrounded by the hole of the third connector.

2. The system of claim 1, wherein the second connector is substantially X-shaped.

3. The system of claim 1, wherein the first connector is substantially X-shaped.

4. The system of claim 1, wherein the first, second and third connectors have a uniform thickness.

5. The system of claim 1, wherein the first width of the at least one arm of the first and second connectors is greater than the inner diameter of the hole of the third connector.

6. The system of claim 5, wherein the first width of the at least one arm of the first and second connectors is greater than or equal to 1.7 inches.

7. The system of claim 1, wherein the at least one arm of the first and second connectors extends distally from a central region of each of the first and second connectors.

8. The system of claim 7, wherein the at least one slotted notch of the first and connectors is formed on the at least one arm of the first connector.

9. The system of claim 8, wherein the at least one slotted notch extends from a distal end of the at least one arm toward the central region of each of the first and second connectors.

10. The system of claim 1, wherein the third connector has formed thereon at least one triangular notch.

11. The system of claim 10, wherein the at least one triangular notch extends from an outer diameter toward the inner diameter of the second connector.

12. The system of claim 10, wherein the at least one triangular notch comprises a plurality of triangular notches.

13. The system of claim 12, wherein the plurality of triangular notches are circumferentially disposed around an outer diameter of the second connector.

14. The system of claim 13, wherein the plurality of triangular notches are spaced from one another by approximately equal distances.

15. The system of claim 13, wherein the plurality of triangular notches are spaced from one another by unequal distances.

16. The system of claim 1, further comprising a paper cylinder, wherein:
   the at least one arm of the first connector comprises at least two arms, each of which extends distally from a central region of the first connector;
   the at least one arm of the second connector comprises at least two arms, each of which extends distally from a central region of the second connector;
   one of the at least two arms of the first connector and one of the at least two arms of the second connector are received in and surrounded by the hole of the third connector; and
   another of the at least two arms of the first connector and another of the at least two arms of the second connector are received in and surrounded by the paper cylinder.

17. The system of claim 16, wherein the paper cylinder comprises a paper cylinder of an exhausted roll of bathroom tissues or paper towels.

18. The system of claim 1, wherein the first width of the at least one arm of the first and second connectors is greater than a second inner diameter of the paper cylinder.

* * * * *